Oct. 2, 1923.                                                    1,469,411
                        C. E. H. ARMBRUSTER
                           REFLECTOSCOPE
                Filed May 23, 1918          3 Sheets-Sheet 1
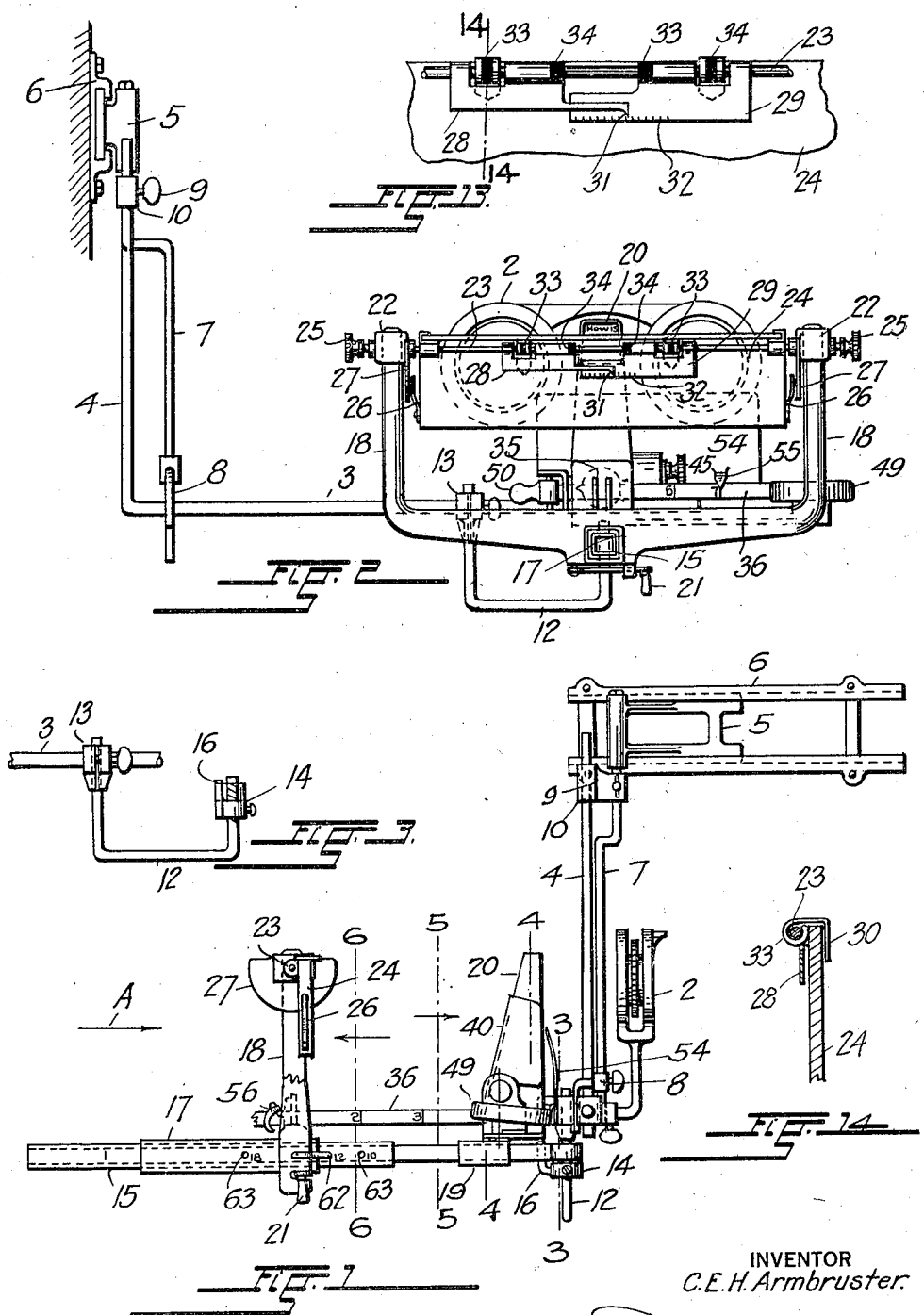
INVENTOR
C.E.H. Armbruster.
ATTORNEY

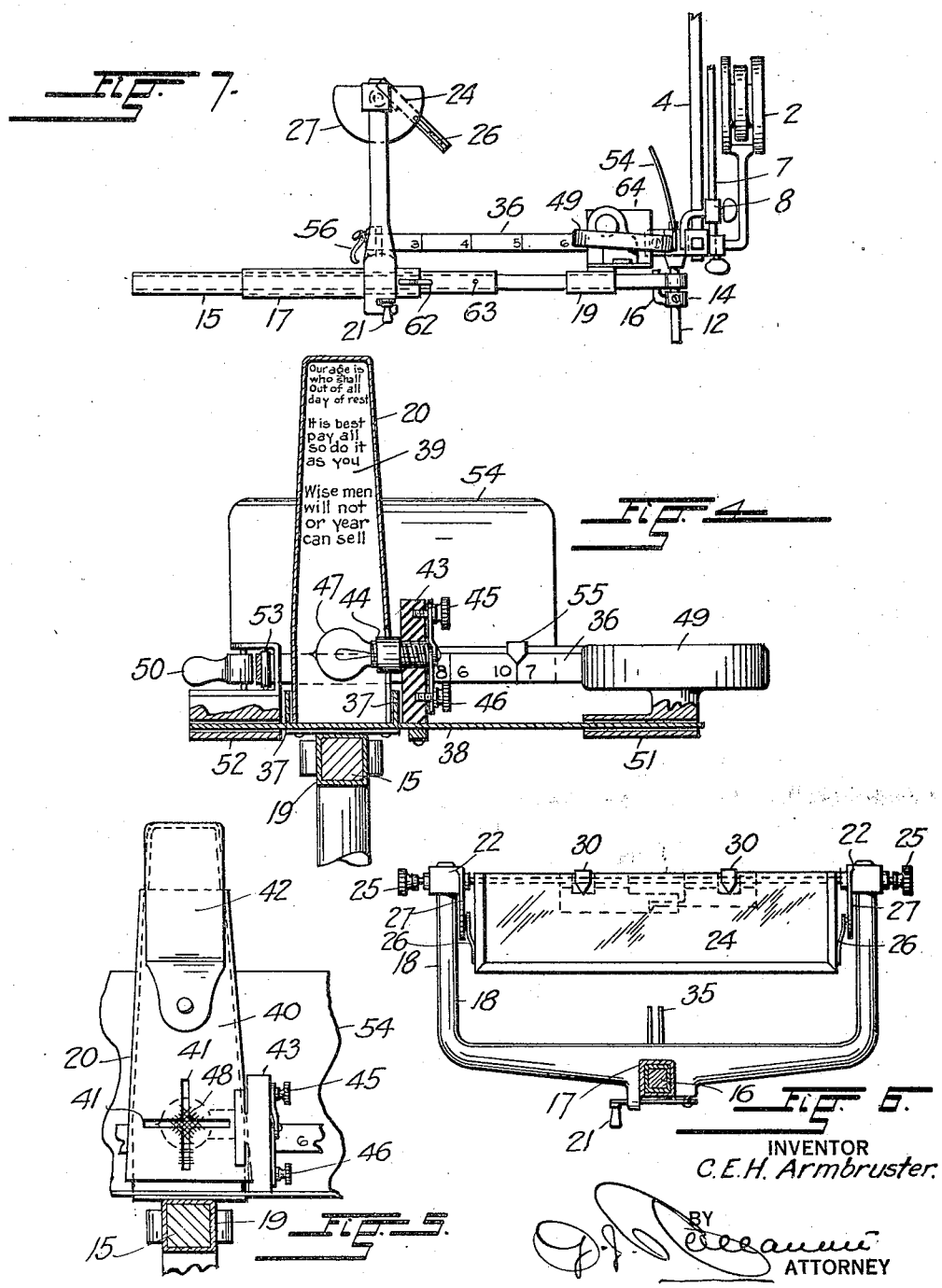

Oct. 2, 1923.
C. E. H. ARMBRUSTER
1,469,411
REFLECTOSCOPE
Filed May 23, 1918
3 Sheets-Sheet 3
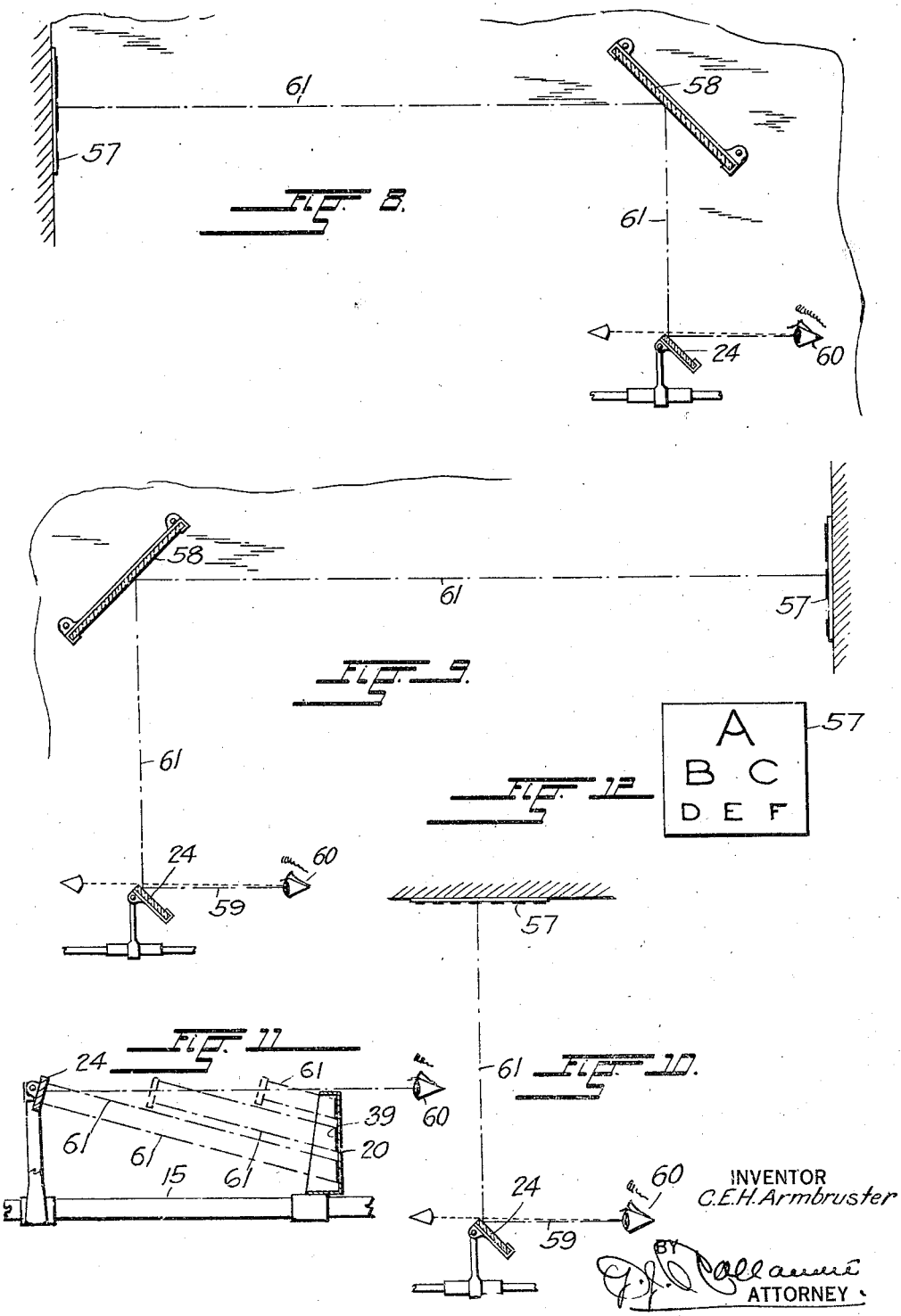

Patented Oct. 2, 1923.

1,469,411

UNITED STATES PATENT OFFICE.

CHARLES E. H. ARMBRUSTER, OF DENVER, COLORADO.

REFLECTOSCOPE.

Application filed May 23, 1918. Serial No. 236,181.

*To all whom it may concern:*

Be it known that I, CHARLES E. H. ARMBRUSTER, a citizen of the United States, residing at Denver, in the county of Denver and State of Colorado, have invented certain new and useful Improvements in Reflectoscopes, of which the following is a specification.

This invention relates to optical instruments of the type used in measuring refractions of the eye and more particularly to improvements in reflectoscopes of the class shown and described in my United States Letters Patent No. 1190619, issued July 11, 1916.

It is the primary object of the present invention to provide a reflectoscope of very simple and compact construction by means of which an operator in examining the eye of a patient by the use of a retinoscope, may look at its fovea centralis along a line which so closely approaches the visual line of the patient's eye that a correct measurement of the refractive error is readily obtained.

Another object of my invention resides in providing an instrument of the class mentioned which may be used for making static tests of the eye while it is looking at infinity, as well as to measure the dynamic power of the eye while it is focused upon a near object.

Still another object of the invention is to provide an instrument which may be used in making static tests within a limited space and which therefore is adapted for operation in rooms which by reason of their limited dimensions or lack of operating space, do not afford the distance between the eye of the patient and a test-object, required to produce the condition of relaxation of the accommodation or focusing power of the eye which is essential in the static test.

Further objects of my invention reside in providing an improved appliance for establishing a point in the visual axis of the eye while it is focusing at a near object for the dynamic test.

Still other objects of the invention reside in the provision of certain adjustments and novel arrangement of parts which enhance the accuracy of the instrument and facilitate its use in measuring refractions of the eye by retinoscopic examination.

An embodiment of my invention in its preferred form has been shown in the accompanying drawings in which like characters of reference designate corresponding parts throughout the various views and in which—

Figure 1 represents a side elevation of the reflectoscope in its operative position with relation to a trial frame of conventional construction, Figure 2, a front elevation of the same looking in the direction of the arrow A, Figure 1, Figure 3, a section along the line 3—3, Figure 1, Figure 4, a section along the line 4—4, Figure 1, drawn to an enlarged scale, Figure 5, an enlarged section taken on the line 5—5, Figure 1 with the instrument in condition for testing the balance of the muscles of motion of the eye, Figure 6, an enlarged section on the line 6—6, Figure 1, Figure 7, a fragmentary side elevation of the instrument in a condition for making the static or distance test, Figures 8, 9 and 10, diagrammatic representations of the lines of vision and paths of reflected light in static tests made by the use of my improved reflectoscope, Figure 11, a diagrammatic view showing the lines of vision and paths of reflected light in the dynamic test, Figure 12, a face view of a test-chart used in conducting the static tests, Figure 13, an enlarged view of the finding appliance at the back of the mirror of the instrument, and Figure 14, a section along the line 14—14, Figure 13.

Referring to the drawings the reference character 2 designates a trial frame of the construction commonly used in optical instruments for the placement of lenses in front of the eyes of a patient.

The frame is supported upon the end of a horizontally extending arm 3 of an L-shaped bracket 4 which is rotatably and vertically adjustably suspended from a carrier 5.

The carrier is movably fitted in a slideway 6 which is fastened against a stationary support such as a wall of the room in which the instrument is installed.

A rod 7 depending from the bracket carries an adjustable stop 8 which by engagement with the horizontal arm of the bracket determines its operative position, and a set-screw 9 on a sleeve 10 of the carrier, through which the upright portion of the bracket extends, secures the parts in their adjusted positions.

My improved reflectoscope consists of a U-shaped bracket 12 which by the use of a clamp 13 at one of its ends is suspended from the horizontal arm of the trial-frame bracket and which has at its opposite end a collar 14 for the rotary support of a horizontally extending bar 15 upon which the operating parts of the instrument are mounted.

A stop 16 on the collar engages the bar to establish its operative position in a vertical plane at right angles to that passing intermediate of the lens-holders of the trial-frame. The supporting bar is preferably composed of telescoping parts of angular section which permit of its being lengthened or shortened in the adjustment of the cooperative parts of the instrument as will hereinafter be more fully explained.

Slidably mounted upon the outer sliding section of the bar is a sleeve 17 which carries a mirror frame 18 and similarly supported upon the inner or stationary member of the bar is a second sleeve 19 which carries a test type holder 20.

The mirror-frame has two uprights at opposite ends of a cross piece which by means of a latch 21 is removably fastened upon the slide 17 in transverse relation to the bar.

Sleeves 22 which are slidably fitted upon the uprights are provided with bearings for the support of the ends of a shaft 23 which is fastened along the upper edge of an oblong mirror 24.

The sleeves 22 are secured in their adjusted positions on the uprights by set-screws 25, and spring clicks 26 at the ends of the mirror cooperate with notched segments 27 on the sleeves 22 to hold the mirror at any one of a determinate number of angles relative to the vertical plane of its axis of rotation.

Slidably and rotatably mounted upon the shaft 23 are the cooperative members 28 and 29 of an appliance which in the operation serves to find points at the upper edge of the mirror in the lines of vision of the eyes of a patient looking into the mirror at the image of a distant object as in the static test, or focusing at the image of a nearer object as in the dynamic test.

The points thus established enable the oculist to look through the retinoscope across the upper edge of the mirror into the fovea centralis of the eyes along lines substantially coincident with their visual axes.

The two members of the finding appliance carry at their outer ends targets 30 which may be placed across the upper edge of the mirror so as to be visible to a patient facing the same, and one of the members has a pointer 31 which cooperates with a graduated scale 32 on the other member to measure the distance between the pupils of the eyes of a patient focusing upon the two targets.

Each member of the finding appliance has furthermore a sight 33 of distinctive color which is alined with the respective target, and a similar sight 34 at a distance from the target which establishes a point in the visual axis of the eye in the dynamic test after the other sight has been placed in the line of vision of the eye while it is looking at infinity to produce the condition of rest required in the static test.

The mirror-frame 18 is furthermore provided with a slotted stop 35 in the center of its cross-piece, to secure a flexible tape 36 by which the distance from the eye of the patient to that of the operator and to a test-object upon which it is focused, are measured as will hereinafter be more fully explained.

The test-chart holder 20 which is mounted upon the slide consists of an upright oblong box of preferably rectangular section which is removably fitted inside a correspondingly shaped rim 37 on a base 38 which is fixed upon the slide 19.

The wall of the box opposite the mirror has an opening to expose a test-chart 39 fastened upon the inner surface of its opposite wall, and a cover 40 fitted upon the sides of the casing is adapted to close the lower portion of the opening in order to expose the upper part of the test-chart only.

Intersecting slots 41 in the lower portion of the cover provide means for ascertaining the muscular strength and balance of the eyes in what is commonly known as the Maddox rod test, and are covered when not in use by a pivoted lid 42.

A block 43 of insulating material adjoining the flanged bottom piece upon which the box 20 is fastened, encloses a small incandescent lamp-socket 44 the terminals of which are connected in a circuit with an electric cell or other suitable source of electricity through the instrumentality of two binding screws 45 and 46.

An incandescent lamp 47 inserted in the socket extends into the box 20 through an opening in the adjacent side thereof and is positioned adjacent the point of intersection of the two slots 41 in the cover 40, one of which extends in a vertical plane, and the other at right angles thereto.

A number of very fine wires 48 crossing each other at the point at which the slots intersect, form a series of small rectangles which in the operation of the instrument are counted by the patient to promote a desire for focusing upon the intersection of the streaks of light appearing through the slots and thereby facilitate the examination of the eye to ascertain its muscular strength and balance in what is commonly known as the Maddox rod test.

The base 38 upon which the holder 20 is mounted is extended at opposite sides thereof for the support of a spring-urged winding-reel 49 for the measuring tape 36, and a clamp 50 adapted to secure an unwound portion of the tape against movement in either direction.

The reel and the clamp are mounted respectively upon sleeves 51 and 52 slidably fitted upon the extensions of the base for the purpose of varying the distance between them.

A roller 53 on the clamp-slide guides the measuring tape unwound from the reel to cause it to move partially in a direction transverse to the supporting bar 15 by its movement in a direction substantially parallel thereto.

A metal plate 54 extending from the clamp slide rearward of the test-type holder provides a back for the portion of the tape extending between the reel and the roller, and a pointer 55 on said plate cooperates with two graduated scales on the tape to designate certain distances from the eye of a patient, required in determining the refractive errors.

The plate 54 also serves as a shield to protect the eyes of a patient looking into the mirror, from the glare of light-rays emitted from the test-type holder.

The tape has at its free end a hook 56 for its connection with a retinoscope held in the hand of the operator or with the stop 35 on the mirror frame.

In the operation of the instrument, the patient is seated behind the trial-frame so as to look through lenses thereon into the mirror along lines at opposite sides of the test-type holder.

The stop 8 which limits the rotary movement of the trial-frame bracket on the carrier 5, and the stop 16 which restricts the movement of the bar 15 upon the end of the U-shaped bracket 12, cooperate to secure the correct position of the different parts of the instrument with relation to each other and the eyes of the patient.

The movement of the carrier in its slideway permits of adjusting the distance between the patient and the trial-frame in a straight line and the sliding movements of the mirror and the test-type holder on the bar 15 enable the operator to adjust their relative positions in accordance with varying conditions.

When making the static or distance test in which it is required that the eye to be examined is brought to a condition of rest by looking at a distant object such as the test-chart 57 shown in Figure 12, the patient does not look at the object itself but at an image thereof appearing in the mirror 24.

The object is placed in different positions with relation to the instrument according to the available space in the room in which the tests are made, the position of articles of furniture in the room, and other conditions.

The test-object may be placed in any desired position in which it is reflected in the adjustable mirror of the instrument either directly or through the intervention of one or more stationary mirrors 58.

In Figure 10 of the drawings the test chart 57 is fastened against an overhead surface, as for example the ceiling of the room in which the instrument is installed.

The distance between the eye 60 of the patient and the mirror, indicated by the broken line 59, plus the distance between the mirror and the test chart designated by the broken line 61, must necessarily equal the distance at which the eyes of the patient looking at a distant object are brought to their required condition of rest.

Assuming that the height of the room is sufficient to give the required distance between the test object on its ceiling and the mirror of the instrument, any variations in the total length of the line of vision between the object and the eye may be readily made by the adjustment of the mirror on the bar 15 which at the same time is shortened or lengthened by movement of its telescoping parts in order to eliminate any rearward projection which may prevent the operator from placing the eye close to the upper edge of the mirror.

In this connection it should be noted that inasmuch as there are certain known distances at which the object must appear to the eye of the patient in both the static and dynamic tests, the relatively sliding parts of the instrument may be provided with cooperative devices such as the clicks 62 and notches 63 shown in Figure 1 of the drawings, to readily determine the proper relative positions of the parts without the aid of the tape or other measuring appliances.

By turning the mirror about its pivotal axis the position of the image reflected therein is changed until the line of vision of the patient's eye intersects the reflective surface in close proximity to the upper edge thereof.

The operator being thus enabled to look across the edge of the mirror into the fovea centralis of the eye along a line which is nearly coincident with the line of vision, now determines the position of the point of intersection of the line of vision with the reflective surface by placing the target of the respective sliding member of the finder on the shaft 23, across the edge of the mirror and moving the member back and forth until the target covers the image of the object in the sight of the patient looking through the trial-frame.

After the target has been placed in this position it is removed from the face of the mirror and the corresponding sight on the adjusted member of the finder indicates the point at which the operator must pass the light beam of the retinoscope to look along the visual axis of the eye.

It will be readily understood by those versed in the art that the operator by looking along a line substantially coincident with the visual axis of the eye of the patient is enabled to make a correct measurement of its refractive errors and that in this respect the present invention is highly advantageous over instruments of the same class in which the operator is compelled to look along a line at an angle to the visual axis of the eye and at a point in the retina away from the fovea centralis, by reason of the necessity of the patient looking at the distant test-object in a line passing either over or alongside the head of the operator.

When the points of intersection of the lines of vision of both eyes of the patient with the reflective surface have thus been determined, the pointer on one member of the finding appliance indicates upon the scale of the other member the correct distance between the pupils of the eyes required in measuring the refractive errors and the sights 34 on the two members give the points at which the visual axes of the eyes will intersect the reflective surface when the patient looks at the reflection of a nearer object in the dynamic test.

The position of the sights 34 relative to the other sights 33 on the members of the finder are ascertained by calculation and inasmuch as with very few exceptions, the static test precedes the dynamic test, but one adjustment of the finder is required to find all the points at the edge of the mirror along which the operator must pass the retinoscopic light-beam to look along the lines of vision of the eyes under examination in either test.

In case the height of the room, or other conditions, render the use of an overhead test-chart objectionable, the object may be placed either back of the patient as shown in Figure 9, or back of the operator as shown in Figure 8.

In each case the image of the object is produced in the mirror of the instrument through the intervention of a stationary mirror 58 which is placed sufficiently high to permit of the passage of rays of reflected light over the heads of the patient and the operator or over those of other persons who while the test is being made, pass between the object and the patient.

During both the static and dynamic tests the end of the tape may if necessary be attached to the mirror frame, as shown in Figure 7, to measure through the intermediary of the pointer the distance between the operator and the eye or the distance at which the eye sees the reflected image of the test-chart.

To obtain both these measurements, the tape has in addition to the scale which indicates the distance between the mirror and the eye of a patient seated behind the test-frame, another scale which gives the distances at which the eye sees the image of the object.

The last-mentioned distances are found by adding to the distance between the eye and the mirror along the line of vision, the distance between the mirror and the object along the line of reflected light under the conditions illustrated in Figure 10, or the sum of the distance between the auxiliary mirror and the mirror 24 of the instrument, and the distance between the auxiliary mirror and the object, as in the construction shown in Figures 8 and 9.

While the static test is being made, the test-type holder used in the dynamic test may be removed and a cap 64 placed over the incandescent lamp to direct the light rays onto the portion of the measuring tape which registers with the pointer, as shown in Figure 7.

In the dynamic or reading test, the patient seated behind the trial-frame looks into the mirror at the artificially illuminated image of the test-chart in the holder placed upon the slide 19.

This chart contains a number of test-types of graduated sizes placed successively in vertical alignment.

The different types are graduated in sizes to correspond with the lengths of lines subtending the normal visual angle (five minutes) at predetermined distances from the eye, and in order to correctly ascertain the focusing power of the eye under examination it is essential that these types are successively brought in the line of vision at distances from the eye, corresponding with the aforesaid predetermined distances.

With this object in view, the mirror 24 is moved along the bar 15 to points at different distances from the test chart in the holder, which are readily ascertained by the cooperative clicks and notches on the relatively sliding parts, hereinbefore referred to.

After the mirror at the farthest distance from the chart, has been adjusted to bring the lowermost test-type in the line of vision of the patient as shown diagrammatically in Figure 11 of the drawings, it is moved toward the test-type holder until the next succeding test-type is in the line of vision and this movement is continued until the approximate focusing power of the eye is ascertained.

With the mirror and the test chart thus relatively positioned, the oculist examines the eyes by looking through the retinoscope across the upper edge of the mirror and along lines approximately coincident with the visual axis, the directions of which are found by the position of the sights on the finding appliance which was adjusted during the preceding static test.

The measuring tape which is fastened to the mirror-frame or held by the operator, measures the distance between the operator and the eye of the patient and the distance at which the patient sees the image of the test chart upon which the eye is focused, by the registration of its scales with the stationary pointer, and it may be held in place after the desired measurements are obtained, by means of the clamp 50.

After the measurements have been noted by the position of the graduations on the two scales of the measuring tape with relation to the stationary pointer, the operator fastens the hook at the end of the tape in an eye of the retinoscope and by looking through the retinoscope at the eye of the patient, moves the same away from the mirror in one direction or the other in order to determine the reversal or true focusing point of the eye.

Should this point of reversal be found to be beyond the distance measured on the scale, the eye of the patient is lacking in focus or accommodation and if the true focus is found to be less than the previously measured distance the eye is over-accommodating.

The amount of lag or over-accommodation is calculated by deducting from or adding to the distance measured on the scale of the tape, the distance between the eye and the true focusing point found by the movement of the retinoscope to which the tape is attached as hereinbefore explained.

If in the dynamic examination it is necessary to focus the eye continuously upon a fixed object during a prolonged period, the cover 40 is placed upon the box with its side covering the intersecting slots so that only the uppermost test type on the chart is visible.

To test the muscle strength of the eye the lid is turned to cover the upper portion of the covering in the box and uncover the intersecting slots upon which the patient focuses the eye under examination by counting the squares between the crossing wires 48 as hereinbefore explained.

It will be understood that the width of the test-type chart and the holder in which it is mounted must be restricted so as not to obstruct the lines of vision between the eyes of a patient looking through the lenses in the trial frame and the mirror in which the image of the test-object appears.

Having thus described my improved reflector in the best form at present known to me, it will be understood that variations in details of construction and arrangements of parts may be resorted to within the spirit of the invention as defined in the following claims:

1. In an instrument of the character described, the combination of a mirror, a box having an opening facing the same, a lamp in the box, a test type in the box, and a removable cover for the opening of the box, having a slot for the emission of light-rays.

2. In an instrument of the character described, the combination of a mirror, a box having an opening facing the same, a series of test-types positioned in the box to be reflected in the mirror, and a cover adapted to partially close the opening for the reflection of one of the test types exclusive of the others.

3. In an instrument of the character described, the combination of a mirror, a box having an opening facing the same, a series of test types positioned in the box to be reflected in the mirror, a cover adapted to partially close the opening for the reflection of one of the test-types exclusive of the others and having a slot for the emission of light rays, a lamp in the box, and an adjustable lid or the cover adapted to either cover said slot or close the uncovered portion of the opening.

4. In an instrument of the character described, the combination of a support, a test-object, a mirror to reflect the object in the line of vision of a person occupying a determinate position with relation to the support, a winding measuring tape on the support, movable to measure the distance at which the mirror is positioned from a person occupying said position, and the distance at which the operator is positioned with relation to the mirror, in retinoscopic examination.

5. In an instrument of the character described, the combination of a support, a test-object, a mirror to reflect the object in the line of vision of a person occupying a determinate position with relation to the support, a winding measuring tape on the support, movable to measure the distance at which the mirror is positioned from a person occupying said position, and the distance at which the operator is positioned with relation to the mirror, in retinoscopic examination, and a clamp on the support to secure the tape in its adjusted position.

6. In an instrument of the character described, the combination of a support, a test-object, a mirror to reflect the object in the line of vision of a person occupying a determinate position with relation to the support, means for adjusting the mirror on the support to vary its distance from a person occupying said position, a winding measuring tape on the support, movable to measure the distance at which the mirror is positioned from a person occupying said position, and the distance at which the operator is positioned with relation to the mirror, in retinoscopic examination, the mirror and the tape having cooperative means for their connection.

7. In an instrument of the character described, the combination of a support, a horizontally extending, longitudinally contractible bar thereon, test objects, and a pivoted mirror slidably mounted on the bar with relation to the test objects and adapted to reflect the objects in the line of vision of a person occupying a determinate position with relation to the support.

8. In an instrument of the character described, the combination of a support, a horizontally extending bar thereon, a test-type, a mirror mounted on the bar to reflect the test-type in the line of vision of a person occupying a determinate position with relation to the support, a winding measuring tape, cooperative means causing it to move partially in a direction transverse of the bar, by its movement in a direction substantially parallel thereto, and a pointer cooperating with the transverse portion of the tape.

9. In an instrument of the character described, the combination of a support, a horizontally extending bar pivoted thereon, a stop determining the operative position of the bar relative to the support, a test-object, and a mirror on the bar for the reflection of the object in the line of vision of a person occupying a determinate position with relation to the support.

10. In an instrument of the character described, the combination of a carrier, a support pivoted thereon, a stop determining the operative position of the support with relation to the carrier, a trial frame on the support, a test-object, and a mirror mounted to reflect the object in the line of vision of a person looking through the trial-frame.

11. In an instrument of the character described, the combination of a carrier, a support pivoted thereon, a horizontally extending bar pivoted on the support, stops determining the operative positions of the support and the bar relative to the carrier, a test-object, and a mirror on the bar to reflect the object in the line of vision of a person occupying a determinate position with relation to the support.

12. In an instrument of the character described, the combination of a slidable carrier, a support pivoted thereon, a trial frame on the support, a horizontally extending bar pivoted on the support, stops determining the operative positions of the support and the bar relative to the carrier, a test-object, and a mirror on the bar to reflect the object in the line of vision of a person looking through the trial frame.

13. In an instrument of the character described, the combination of a support, a test-object, a mirror mounted to reflect the object in the line of vision of a person occupying a determinate position with relation to the support, and a finder having a sliding movement back of the mirror along the upper edge thereof, and including a sight which determines a point at which the observer looks along the line of vision of a patient focusing in the mirror, and an opaque target alined with the sight and adjustable to cover a part of the mirror below the same.

14. In an instrument of the character described, the combination of a support, a test-object, a mirror mounted to reflect the object in the line of vision of a person occupying a determinate position with relation to the support, and a finder comprising a pair of members having a sliding movement back of the mirror along the upper edge thereof, said members having sights which determine points at which the observer looks in the lines of vision of a person focusing in the mirror, and cooperative scale-parts on the members to measure the distance between said points.

15. In an instrument of the character described, in combination, a horizontally sliding carrier, a bracket depending from the carrier and having a projecting arm, a trial frame on the projecting arm of the bracket, and a test object connected to the bracket opposite to the trial frame.

16. In an instrument of the character described, in combination, a horizontally sliding carrier, a movable bracket on the carrier depending therefrom and having a projecting arm, a stop located in the path of said arm and limiting the movement of the bracket, a trial frame on the bracket, and a test object connected to the bracket opposite to the trial frame.

17. In an instrument of the character described, a slideway adapted to be fastened to an upright support, a carrier movable in said slideway, a bracket depending from the carrier and having a projecting arm, and a trial frame on the projecting arm of the bracket.

18. In an instrument of the character described a slideway adapted to be fastened to an upright support, a carrier movable in said slideway, a bracket depending from and movable on the carrier and having a projecting arm, a stop located in the path of the arm limiting the movement of the bracket, and a trial frame on the projecting arm of the bracket.

19. In an instrument of the character described, in combination, a test object, a mirror facing the same, and a sliding finder on the mirror, having at the upper edge thereof, a sight to establish a point in the line of vision of a person looking at an image of the test object in the mirror, in the static test, and a second sight at a determinate distance from the other, which simultaneously establishes a point in the line of vision in the dynamic test.

20. In an instrument of the character described, in combination, a test object, a mirror facing the same, and a sliding finger on the mirror, having at the upper edge thereof, a sight to establish a point in the line of vision of a person looking at an image of the test object in the mirror, in the static test, a target in line with said sight and adapted to cover a part of the mirror below the same, and a second sight at a determinate distance from the other, which simultaneously establishes a point in the line of vision in the dynamic test.

21. In an instrument of the character described the combination of a chart located beyond the line of visual axis of the patient and having dissimilar test types arranged in vertical succession, a slanting mirror facing the chart, and means for compelling a patient to focus at an image in the mirror along a determinate line of vision, the mirror being movable in a straight line relative to the chart whereby to bring its types successively in the line of vision of the patient.

22. In an instrument of the character described, the combination of an overhead test object, a slanting mirror located beneath the test object to reflect the same, and movable toward and from the patient, there being sufficient space immediately back and above the mirror to permit an observer to look across the upper edge of the mirror into the eye of the patient along the line of visual axis, and a measuring tape connected to and movable with the mirror in the backward and forward movement of the same for measuring the distance from the eye of the patient.

23. In an instrument of the character described, the combination of a chart having dissimilar test types arranged in vertical succession, a slanting mirror facing the chart, and means for compelling a patient to focus at an image in the mirror along a determinate line of vision, said chart being located outside of the line of axial vision of the patient, and the mirror being movable in a straight line relative to the chart whereby to bring its types at different elevations successively in the line of vision of the patient.

In testimony whereof I have affixed my signature.

CHARLES E. H. ARMBRUSTER.